United States Patent [19]

Bloomquist et al.

[11] 4,241,429
[45] Dec. 23, 1980

[54] VELOCITY DETERMINATION AND STACKING PROCESS FROM SEISMIC EXPLORATION OF THREE DIMENSIONAL REFLECTION GEOMETRY

[75] Inventors: Marvin G. Bloomquist, Arlington; Yung-liang Wang, Irving, both of Tex.

[73] Assignee: Mobil Oil Corporation, New York, N.Y.

[21] Appl. No.: 883,087

[22] Filed: Mar. 3, 1978

[51] Int. Cl.³ .............................................. G01V 1/36
[52] U.S. Cl. ........................................ 367/52; 367/53; 367/63; 364/421
[58] Field of Search ............... 340/15.5 TC, 15.5 TD, 340/15.5 DP; 364/421; 33/1 E, 1 HH

[56] References Cited
U.S. PATENT DOCUMENTS 3,417,370 12/1968 Brey ............................ 340/15.5 TD
3,696,331 10/1972 Guinzy et al. ............... 340/15.5 DP Primary Examiner—Nelson Moskowitz
Attorney, Agent, or Firm—C. A. Huggett; William J. Scherback

[57] ABSTRACT

In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections in each set appear with time differences on a hyperbola with trace spacings determined by the source receiver coordinate distance along the lines of exploration. The offset of the apex of this hyperbola is determined from a normal move-out velocity search of the type performed on two dimensional CDP sets. This search identifies the correct stacking velocity and hyperbola offset which are used to determine dip, strike and average velocity.

8 Claims, 13 Drawing Figures

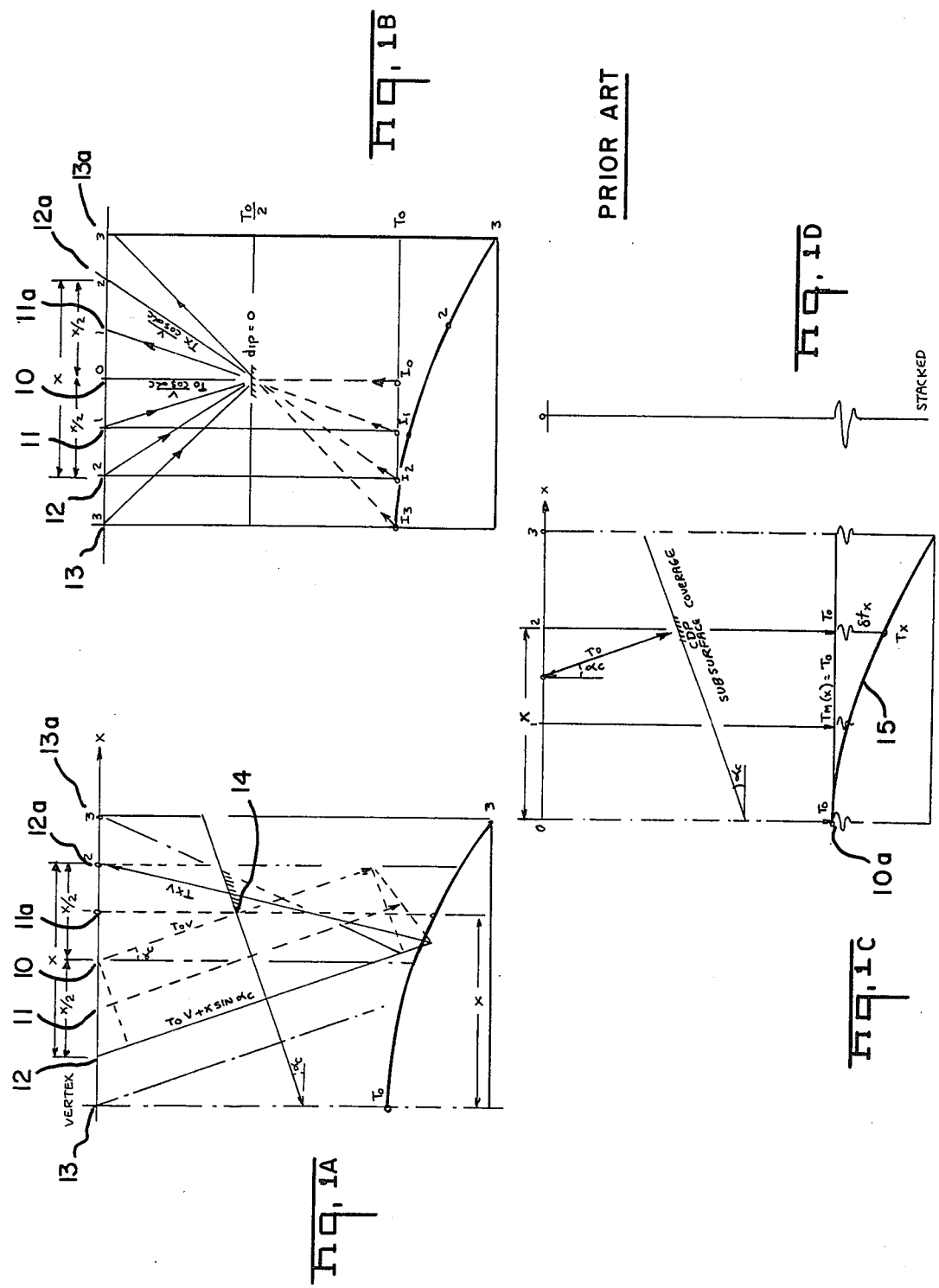

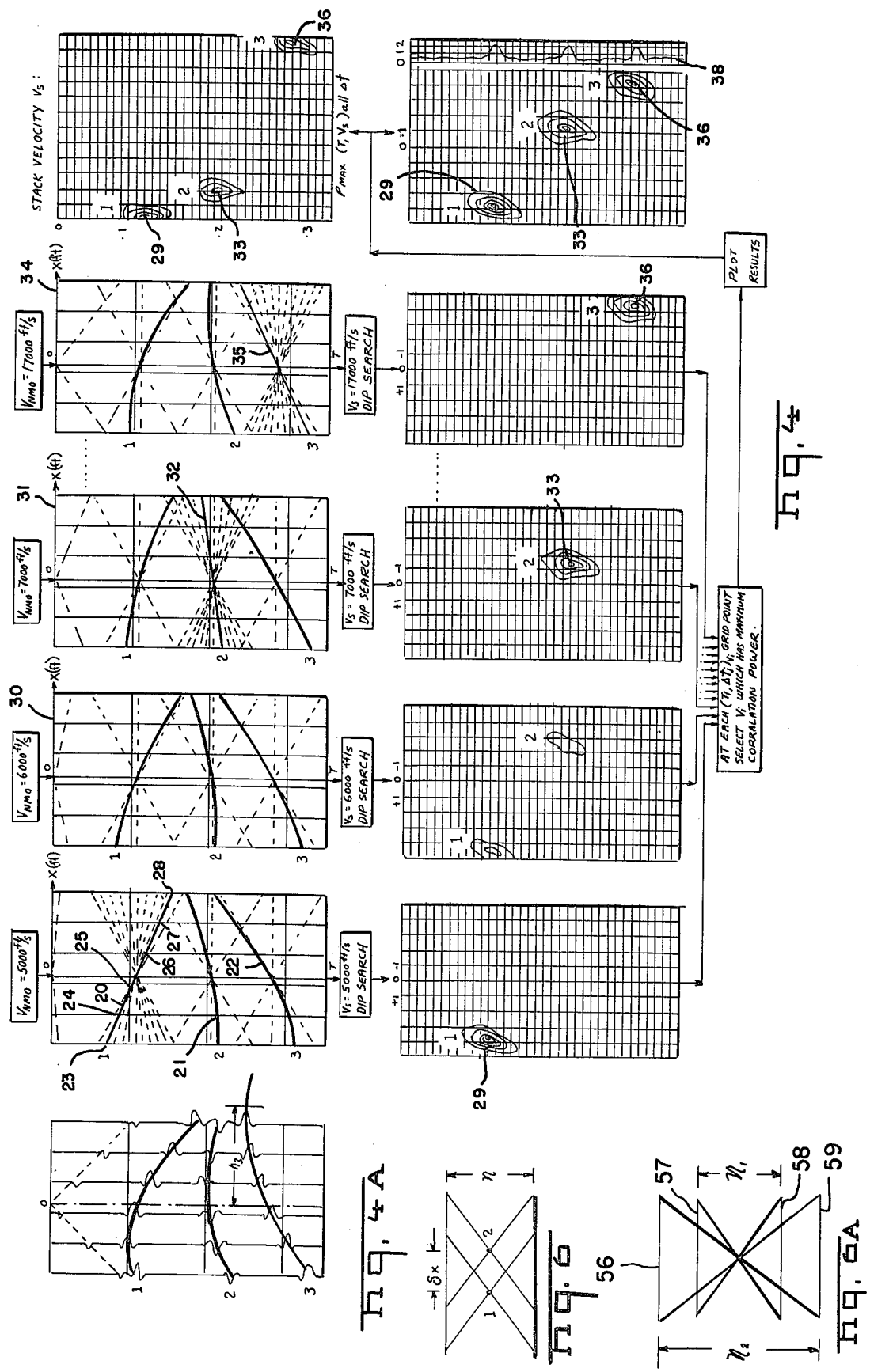

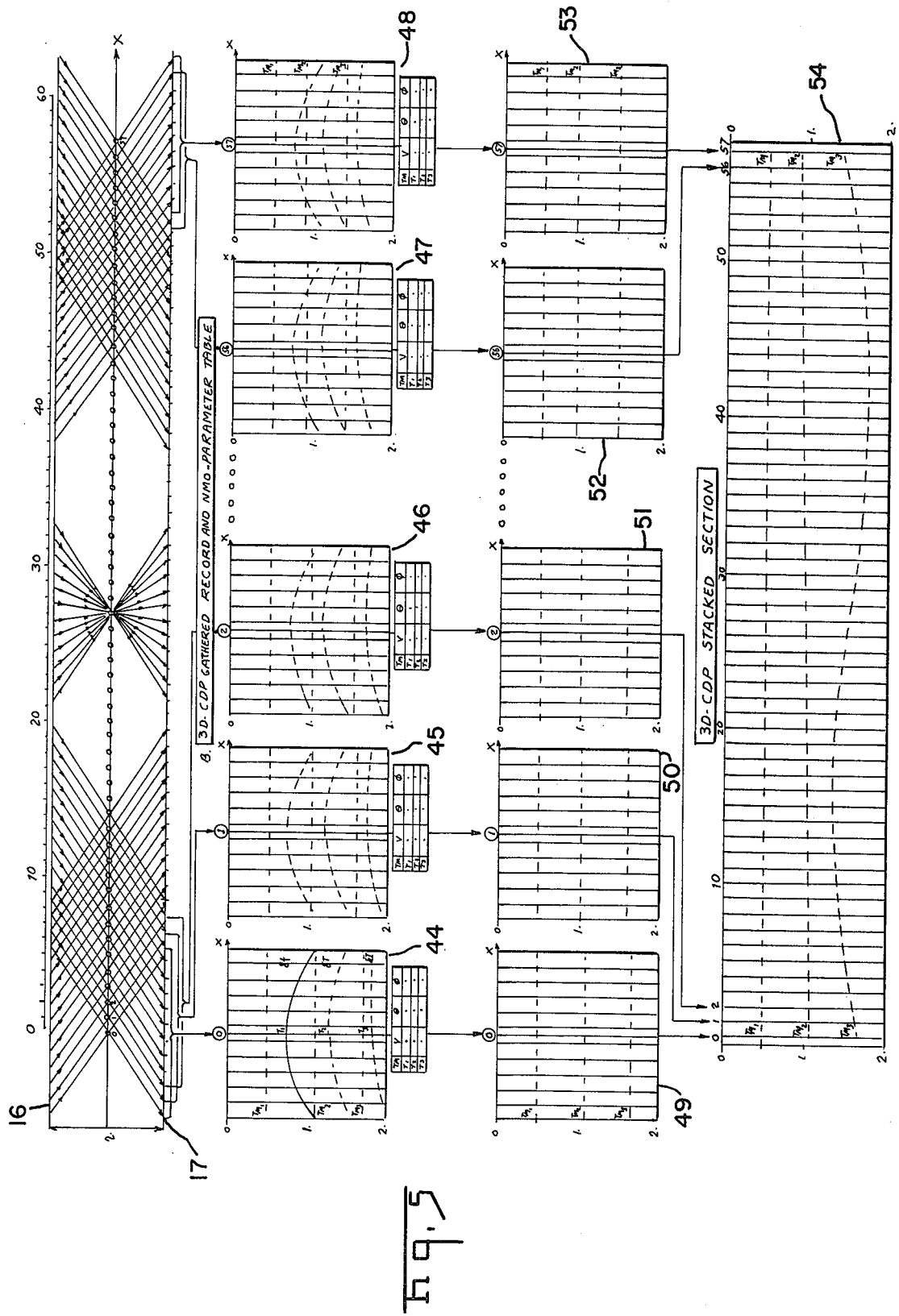

VELOCITY DETERMINATION AND STACKING PROCESS FROM SEISMIC EXPLORATION OF THREE DIMENSIONAL REFLECTION GEOMETRY

BACKGROUND OF THE INVENTION

This invention relates to seismic exploration and more particularly to the determination of velocity, dip and strike from common depth point sets of seismograms with three dimensional reflection geometry.

In seismic exploration, the measurement of velocity, dip and strike is important. From these parameters, the seismograms can be normal move-out corrected and common-depth-point traces can be stacked to closely represent the nature of the subsurface of the earth.

Normally, seismic exploration is carried out along a line. Pulses of seismic energy are generated by sources at spaced points along the line of exploration, and seismic energy reflected from subsurface interfaces is detected at spaced points along this line. The resulting seismograms can be easily corrected for normal move-out and velocity can be determined. Recently, a type of exploration in which seismograms are gathered into sets, each representing reflections from common depth points, has become prevalent. U.S. Pat. No. 3,697,939, Musgrave, describes common depth point (CDP) seismic exploration and the method of determining velocity from common depth point sets of seismograms.

U.S. Pat. No. 3,417,370, Brey, describes a method of determining velocity from CDP sets by searching the sets with various normal move-out velocities. The signal power across these seismic sets is detected and the maximum signal power identifies the correct normal move-out velocity.

U.S. Pat. No. 3,696,331, Guinzy et al, describes a velocity search procedure which also identifies the dip of the subsurface formations along the line of exploration.

Obtaining velocity from common depth point sets with two dimensional reflection geometry as described in the aforementioned patents is extensively used. However, there are certain situations in which seismic exploration with three dimensional reflection geometry is highly desirable. Three dimensional exploration has a high density of traces which provides greater accuracy and more detailed subsurface information that is especially important in geologically complicated areas. The processing of seismograms from three dimensional exploration is more complicated. However, the unit cost of three dimensional exploration is much less for the same information if a large number of receivers for each source are used. Moreover, in areas of unfavorable surface conditions, such as swamps, no permit areas, rivers or undershooting in salt-dome and shale-mass areas, the three dimensional CDP exploration becomes a necessity.

SUMMARY OF THE INVENTION

In accordance with this invention, common depth point sets of seismograms with three dimensional reflection geometry are used to obtain the dip and strike of the subsurface reflecting interfaces and the average velocity over the paths of the seismic energy to the interfaces.

In accordance with one aspect of the invention, the CDP sets are normal move-out corrected with trace spacings determined by the source receiver coordinate distance along the lines of exploration instead of the true separation distances. With this arrangement, the reflection times on the traces before normal moveout correction of the set fall on a hyperbolic arc whose apex is offset from the point along the line closest to the shot point. By performing a linear step-out time search on the normal move-out corrected traces the stacking velocity and step-out time are measured. From these, the offset of the hyperbola and the correct hyperbola velocity can be determined.

In accordance with this invention, the step-out time offset and the hyperbola velocity are easily converted into average velocity, dip and strike. From these parameters the normal-move-out time is derived and applied for stacking.

SHORT DESCRIPTION OF THE DRAWINGS

FIG. 1A depicts a prior art seismic exploration technique for obtaining common depth point sets of seismograms;

FIG. 1B depicts the equivalent field procedure to FIG. 1A but with a non-dipping reflecting interface;

FIG. 1C depicts the CDP set for the four detected traces;

FIG. 3 is a flow sheet depicting the process of the invention;

FIG. 4 depicts plots which aid in understanding the process;

FIG. 4A depicts a CDP set having three reflections;

FIG. 5 depicts the outputs of the entire normal move-out and stacking procedure;

FIG. 6 is an example of another form of three dimensional seismic exploration;

FIG. 6A is another example of three dimensional seismic exploration; and

DESCRIPTION OF THE PREFERRED EMBODIMENT

FIGS. 1A–1C depict the prior art of seismic exploration to obtain common depth point sets of seismograms with two dimensional reflection geometry.

In FIG. 1A, a pulse of acoustic energy is generated at 10. It is reflected from the common reflecting point 14 and detected by a detector at 10 to produce the reflection 10a in the set of CDP traces shown in FIG. 1C. Similarly, a pulse is generated at 11 and detected at 11a, a pulse is generated at 12 and detected at 12a, and a pulse of seismic energy is generated at 13 and detected at 13a.

FIG. 1B shows the equivalent field procedure to that of FIG. 1A as far as the reflection times are concerned but with a non-dipping reflecting interface and the median velocity is the same as the stacking velocity.

The four detected traces are the CDP set shown in FIG. 1C. All contain reflections from a short straight line segment through the common reflecting point 14 in the up-dip direction. The reflections across the CDP set in FIG. 1C fall on the hyperbolic arc 15 which has its apex at the time $T_O$ which is the time of the reflection on the trace with zero source-receiver spacing. The prior art teaches how to normal move-out correct such a CDP set to the zero source-receiver time $T_O$. Then the traces can be stacked to produce a signal trace having a reflection with enhanced signal to noise power as shown in FIG. 1D.

In CDP sets with two dimensional reflection geometry as shown in FIGS. 1A–1C, the reflections fall on a hyperbola which has its apex at the zero source receiver position. Prior art techniques, such as described in the aforementioned Brey and Guinzy et al patents, search along the different hyperbolas associated with different searching velocities. The traces are cross-correlated or summed along these various hyperbolas to determine which hyperbola produces the maximum signal power. The hyperbola which produces the maximum signal power is associated with the correct stacking velocity which is thereby determined. The aforementioned Guinzy et al patent also describes, column 5, line 30, a searching technique for use on field, or monitor, records which are not CDP sets. In such field records, the reflections also occur on a hyperbola but the apex is offset when there is a dipping formation. The Guinzy et al technique searches through all velocities and dips to find the correct hyperbola velocity and the correct hyperbola apex offset.

Figure 2A:
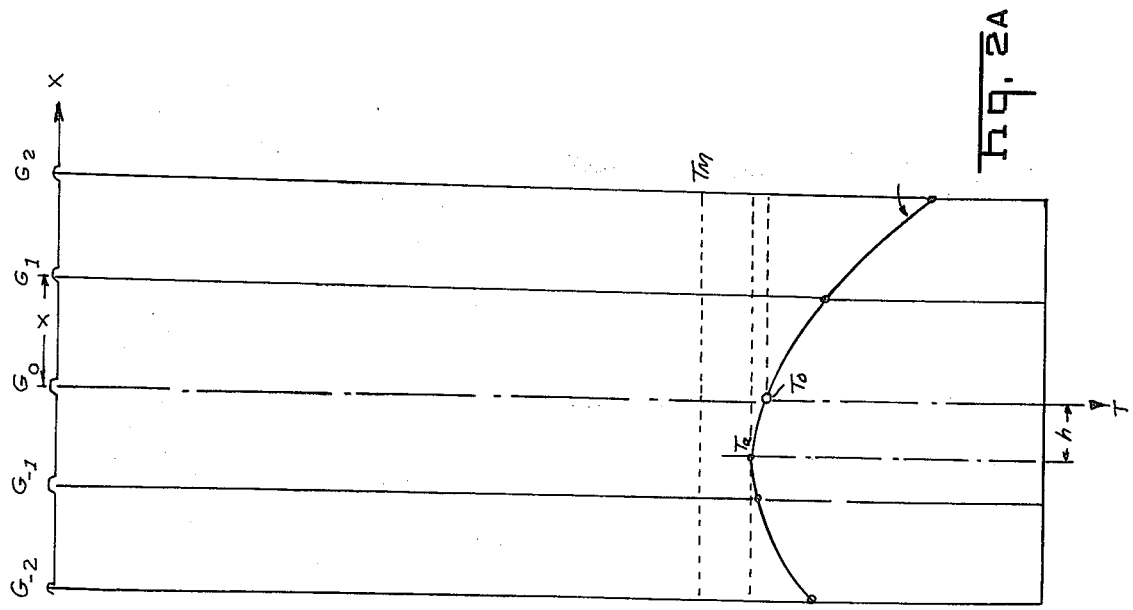
FIG. 2A depicts the CDP sets with reflections which occur on an offset hyperbola.
Figure 2:
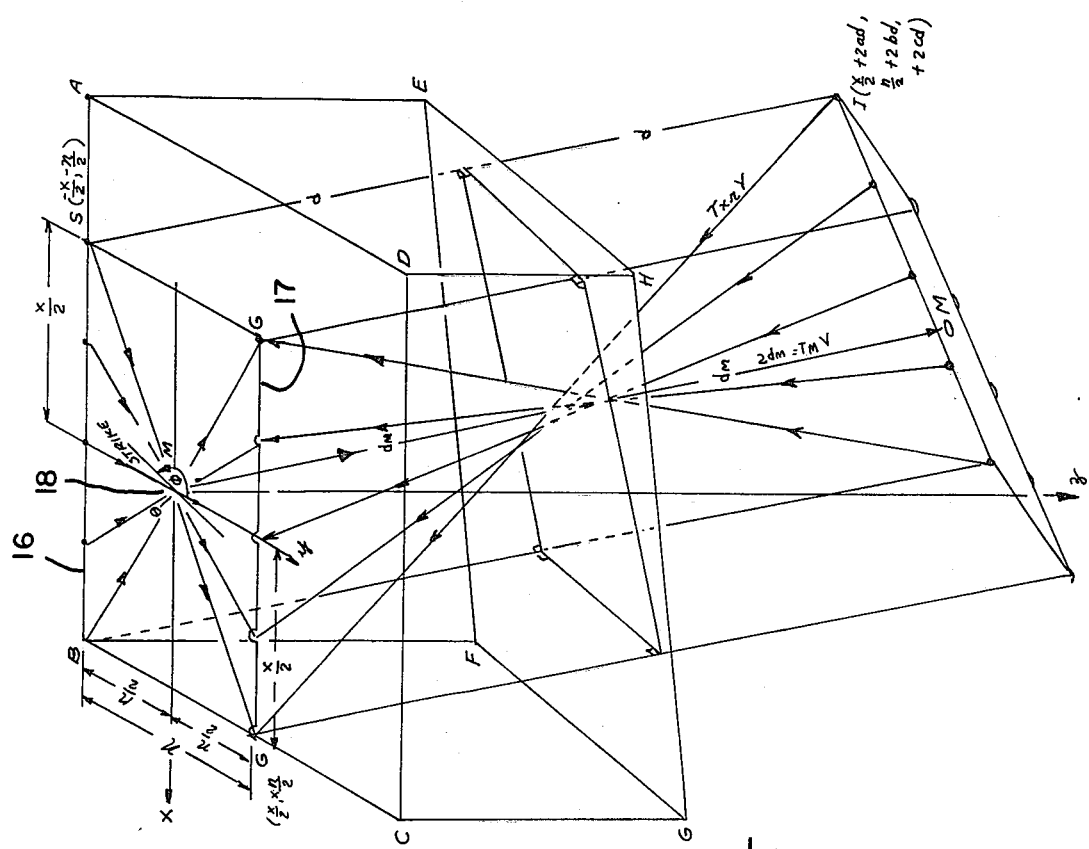
FIG. 2 depicts a field procedure with three dimensional reflection geometry.

Three dimensional reflection geometry, as shown in FIG. 2, produces CDP sets with reflections which occur on an offset hyperbola as shown in FIG. 2A. In accordance with this invention, the offset h and hyperbola velocity $V_a$ are easily determined. From this offset h and the determined hyperbola velocity, the average velocity, dip and strike of the subsurface interface are easily determined. These are used to correct the traces of the set to the time $T_M$, which is the zero source-receiver time at the CDP, so that the traces can be stacked for signal enhancement.

Referring now to FIG. 2 in more detail, the basic three dimensional seismic exploration geometry includes generating pulses at spaced points along at least one line of exploration 16 and detecting the seismic energy at spaced points along at least one other parallel line 17. The lines of exploration 16 and 17 are on the horizontal datum plane ABCD. Seismic energy is reflected from the subsurface interface plane EFGH which has a dip $\theta$ and a strike $\phi$. The origin 18 is referred to as the common depth point or common surface mid-point. The source line 16 and the geophone line 17 are parallel to the X axis and the distance between them is $\eta$. Such exploration produces linear (parallel to exploration line), multiple fold, common depth point sets of seismograms with three dimensional reflection geometry. In accordance with this invention, the dip, strike and velocity are easily determined from such CDP sets.

FIG. 3 depicts the process of this invention and FIGS. 4 and 4A show plots which aid in understanding the process. FIG. 4A depicts a CDP set having three reflections.

The first step of the process, indicated at 19 FIG. 3 is to correct the set for various normal move-out (NMO), or searching velocities $V_{NMO}$. After time shifting these traces for an assumed NMO velocity of 5,000 feet per second, the reflections appear along the heavy lines shown at the upper left hand corner of FIG. 4. Each trace has been normal move-out corrected by an amount $$\delta T = T_x - \sqrt{T_x^2 - X^2/V^2_{NMO}}$$

where x is the distance along the x-axis between shotpoint and receiver, $T_x$ is the uncorrected time for the trace at x, and $V_{NMO}$ is 5,000 feet per second. After time shifting by this amount, the first reflections all fall along the straight line 20. The second and third reflections occur along the curved lines 21 and 22.

In accordance with this invention, after normal move-out for each searching velocity, a signal power search is performed along straight lines associated with various step-out times ($\Delta t$), the procedure being denoted 20 in FIG. 3. One signal power detection technique is to detect or sum the amplitude of the traces along the straight line. For example, the samples at 23–28 are all summed to produce a signal power which is plotted at 29 in FIG. 4. Another signal power detection technique is cross-correlation. By cross-correlating the windows of the traces at the times 23–28, a similar high signal power will be detected. Because the first reflections occur on the straight line 20, after normal move-out correction with $V_{NMO}=5,000$ feet per second, the high signal power indicated at 29 is produced. However, a high signal power is not produced for the second and third reflections.

The same search is performed for other searching velocities. The set 30 represents the traces after being NMO corrected for a searching velocity of 6,000 feet per second. None of the three reflections occurs along a straight line and there is no high signal power output. The set 31 has been NMO corrected with a searching velocity of 7,000 feet per second. The second reflection occurs along the straight line 32. Accordingly, detection of the signal power along the straight line 32 produces a high signal power which is recorded at 33. The set 34 has been NMO corrected with a searching velocity of 17,000 feet per second. The third reflections occur along the straight line 35. Detection of the signal power along this straight line produces a high indicated signal power plotted at 36.

The upper right-hand corner of FIG. 4 shows the signal powers 29, 33 and 36 plotted as a function of velocity. This identifies the correct stacking velocity $V_S$ (that is the value of $V_{NMO}$ which gives maximum power) for the first reflection to be 5,000 feet per second, the correct stacking velocity $V_S$ for the second reflection to be 7,000 feet per second, and the correct stacking velocity $V_S$ for the third reflection to be 17,000 feet per second.

The step of selecting the straight line which produces the maximum detected signal power is indicated at 37 in the flow chart of FIG. 3. In accordance with this invention, the slope $\Delta t$ of the straight line which produced maximum detected signal power is also determined. The slope of the line 25 is determined to be $+0.040$ milliseconds per foot. The slope of the straight line 32 is determined to be $-0.015$ milliseconds per foot. The slope of the straight line 35 is determined to be $-0.045$ milliseconds per foot. The plot at the lower right-hand corner of FIG. 4 shows the three signal powers 29, 33 and 36 plotted on a dip scale which identifies the aforementioned slopes of the straight lines 20, 32 and 35.

The plot 38 shows maximum signal power as a function of record time. It identifies the $T_O$'s of the three reflections as occurring at 0.11 seconds, 0.20 seconds, and 0.285 seconds. From the determined values of stacking velocity $V_S$, slope $\Delta t$ and record time $T_O$, the hyperbola-velocity and the apex offset of the hyperbola on which the reflections occur can be determined. The hyperbola-velocity $V_a$ and hyperbola offset $h$ are related to the determined stacking velocity $V_S$, slope $\Delta t$ and time $T_O$ by $$V_a = V_s / + \sqrt{1 + (V_s \Delta t)^2}; \quad h = -T_0 V_a^2 \Delta t$$

From two sets of ($V_a$, $\Delta t$), the average velocity $V$, the dip $\theta$ and the strike $\phi$ of the reflecting interface can be determined as indicated by step 39 in FIG. 3. Specifically, for two CDP along the line of exploration as shown in FIG. 6, the velocity dip and strike are determined from $$V = V_a \sqrt{w/(1 + w)}$$

$$\phi = \tan^{-1}\left(\frac{-V_a^2 \Delta t_1 T_{01}}{\eta} w\right)$$

$$\theta = \sin^{-1}\left\{ \sqrt{1 - (V/V_a)^2} \, / \cos\phi \right\}$$

where $$w = \frac{-\psi_2 \pm \sqrt{\psi_2^2 - 4\psi_1 \psi_3}}{2\psi_1}$$

$$\psi_1 = \left(\frac{V_a}{2}\right)^2 \left[ \left(\frac{T_{01}^2 - T_{02}^2}{2\delta x}\right)^2 - T_{01}^2 \Delta t_1^2 \right]$$

$$\psi_2 = \left(\frac{\eta}{V_a}\right)^2 + \frac{T_{01}^2 V_a^2 \Delta t_1^2}{2} - \left(\frac{T_{01}^2 + T_{02}^2}{2}\right)$$

$$\psi_3 = \frac{\delta x^2 + \eta^2}{V_a^2}$$

$\delta x$ = distance between CDP points,
$\Delta t$ is the slope of the straight line for a CDP set,
$T_O$ is the travel time at $x=0$ for a CDP set,
$\eta$ is the distance between the line of exploration on which pulses of seismic energy is generated and the line of exploration on which seismic energy is detected and subscripts 1 and 2 denote two adjacent CDP sets.

From average velocity $V$, dip $\theta$ and strike $\phi$, the time shift $\delta t$ required to correct each trace to the zero source receiver distance can be determined. This is indicated at 40 in the flow sheet of FIG. 3 and is carried out in accordance with:

$$\delta t = T_x - T_m = T_x - \sqrt{T_x^2 - \left(\frac{\eta \cos\theta}{V \cos\alpha_c}\right)^2 - \left(\frac{x \cos\alpha_c - \eta \sin\alpha_c \sin\beta_c}{V}\right)^2}$$

where
$T_x$ = uncorrected travel time at trace located at $x$,
$\sin \alpha_c = \cos \phi \sin \theta$, and
$\sin \beta_c = \sin \phi \sin \theta$.

This time $\delta t$ can be used to normal move-out correct the traces as indicated by step 41 in FIG. 3.

The steps 19, 20 and 37 are performed in a routine referred to as VIPSKEW. This procedure is repeated for adjacent sets of traces as indicated by step 42 in the flow chart. All adjacent sets are processed as indicated by step 43. This can be better understood from reference to FIG. 5 which depicts the outputs of the entire normal move-out and stacking procedure. The top of FIG. 5 depicts the two parallel lines 16 and 17 on the surface of the earth. Pulses of seismic energy are generated at spaced points along the line 16 and detected at the detectors at spaced points along the line 17. As indicated in FIG. 5, fifty-seven CDP sets are produced. Each set is comprised of twelve traces, with each set representing reflections from a common depth point. These include the CDP sets 44–48 and others. For each two CDP sets, values of average velocity $V$, dip $\theta$ and strike $\phi$ are determined for each reflection window on each CDP set. From these values of $V$, $\theta$ and $\phi$, the normal move-out time shift $\delta t$ is determined in accordance with step 40 of the flow sheet in FIG. 3. The normal move-out corrected sets, the result of step 41 in FIG. 3, are shown at 49–53 in FIG. 5. These are stacked to produce the stacked section 54, the stacking being indicated as step 55 in FIG. 3.

The present invention may be practised with other forms of three dimensional seismic exploration. Another example is shown in FIG. 6A. In this case, pulses of acoustic energy are produced at spaced points along two parallel lines of exploration 56 and 57. Seismic energy is detected at spaced points along the parallel lines 58 and 59. The searching procedure performed on the data is the same as that discussed above. However, in this case, the determination of hyperbola velocity and hyperbola offset $h$ are given by:

$$V_{a1} = V_{a2}, l_1 = l_2$$

$$T_{m1} = T_{m2}$$

$$\alpha = (V/V_a)^2 l = 2h_1/\eta_1 = 2h_2/\eta_2$$

where
$T_{a1}$ = minimum (apex) travel time for set 1
$T_{a2}$ = minimum (apex) travel time for set 2

$$-\alpha^2 \left[ \left(\frac{T_{a1}^2 - T_{a2}^2}{\eta_1^2 - \eta_2^2}\right) V_a^2 \right] + \left[ 1 - l^2 + \left(\frac{T_{a1}^2 - T_{a2}^2}{\eta_1^2 - \eta_2^2}\right) V_a^2 \right] \alpha - 1 = 0$$

This is a quadratic in $\alpha$ which is solved for the real positive root.

Figure 7:
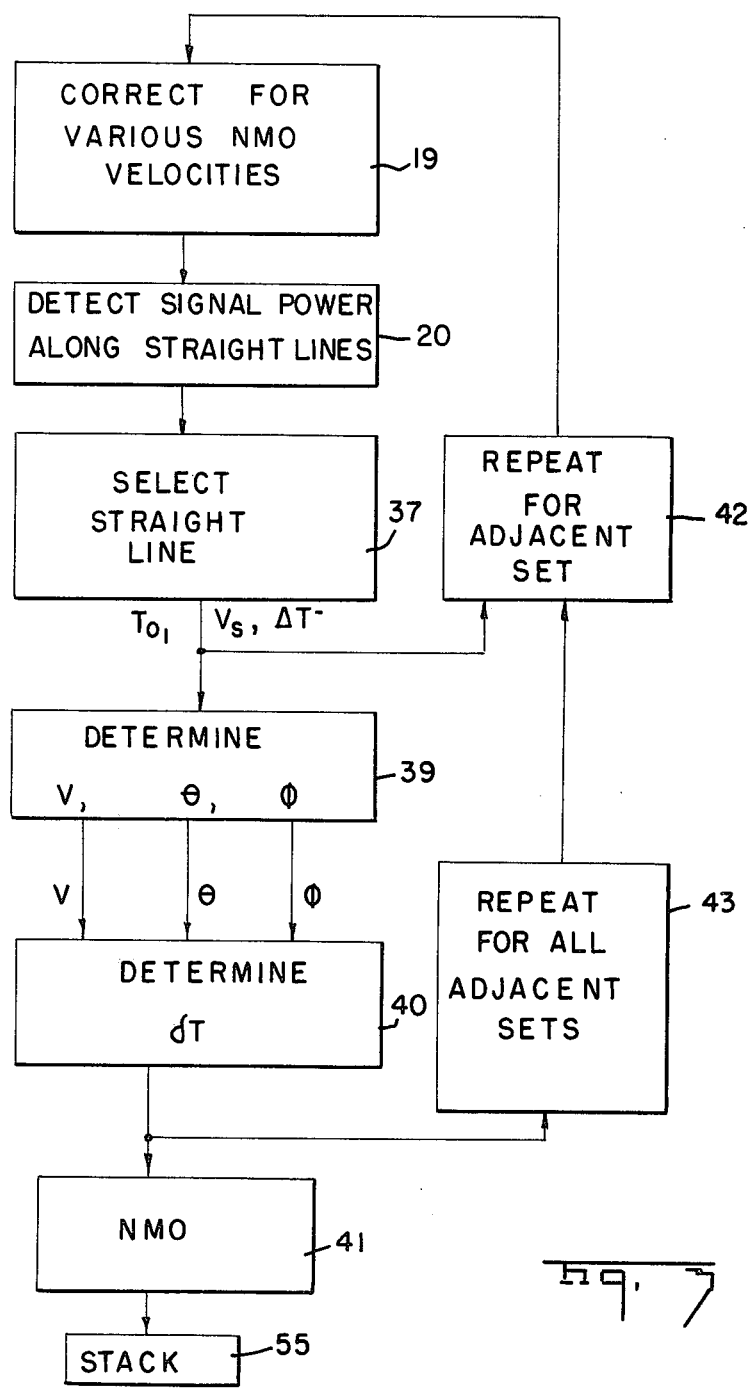
FIG. 7 is a flow chart depicting a sub routine in more detail.
Figure 7:
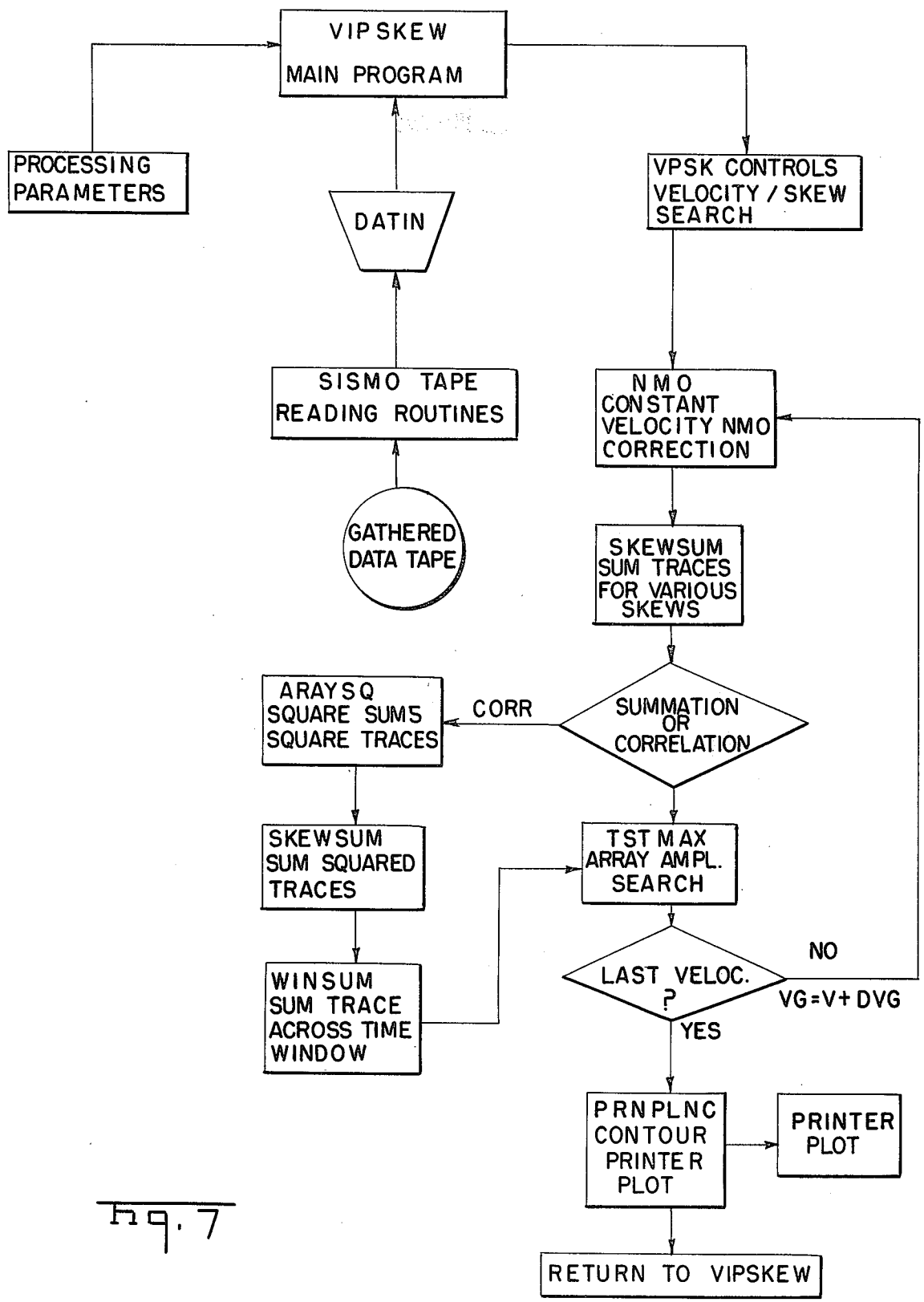

FIG. 7 is a flow chart depicting procedure VIPSKEW in more detail. The inputs to the procedure are linear, multiple fold, common depth points sets of seismograms with three dimensional reflection geometry. The output is a plot of the type shown at the bottom of FIG. 4. The output is also digitized for further processing in accordance with steps 39, 40, 41 and 55. It will be understood that these steps are standard computational or normal move-out correction steps.

An exemplary program listing for carrying out the VIPSKEW procedure is given in the appendix. This program is written in Fortran language for performance on commercially available Control Data Corporation computers.

While a particular embodiment of the invention has been shown and described, various modifications are within the true spirit and scope of the invention. The appended claims are intended to cover all such modifications.

APPENDIX

```
VIPSKEW,CM117700,T247,NT1.50100627000,MGBLOOMQUIST.
FTN(L,R=1)
REDUCE.
REQUEST TAPE1,NT,HD,SV,NORING,VSN=G2067.
LGO.
UNLOAD(TAPE1).
EXIT.
UNLOAD(TAPE1).
      PROGRAM VIPSKEW(INPUT,OUTPUT,TAPE1,TAPE2)
      DIMENSION T(5000),TN(5000),TVX(4500),TSUM(4500),
     1TSKX(1000),ISCR(650)
      EQUIVALENCE (ISCR,TVX),(TSKX,TSUM)
      COMMON DVG,VGO,DTXMX,NV,NST,TST,NTYPE,XT(24),JA(3),ICON(48),DEL
     1,SAMR,TWIN,TSO(24),XMX,VMAX
      NTXMX=5000
      NSMX=4500
C
C*********************************************************************<
C
C     NTXMX IS DIMENSION OF T AND TN, NSMX IS DIMENSION
C     OF TVX AND TSUM. NTXMX SHOULD BE GT.OR.EQ NFOLD*NDATA POINTS.
C     NSMX GT.OR.EQ. NSKEW*NDATA POINTS(NP).
C     SKEW RANGE IS +-DTXMX PER TRACE
C     NUMBER OF SKEWS IS NSKEW
C     BEGINNING VELOCITY FOR VELOCITY SEARCH IS VGO. INCREMENT IS DVG.
C     NUMBER OF VELOCITIES IS NV. NV IS LIMITED ONLY BY COMPUTER TIME.
C     ORIGINAL TRACES ARE STORED IN ARRAY T
C     NMOED TRACES IN TN
C     MAXIMUM VALUES FOR EACH SKEW ARE IN TVX
C     MAXIMUM VALUES FOR EACH VELOCITY ARE IN TSKX. DIMENSION OF
C     TSKX ACTUALLY CONTROLLED BY DIMENSION OF TSUM.
C     TRACE LOCATIONS ARE IN XT.
C     CORRELATIONS OR SUMMATIONS FOR EACH SKEW AT VELOCITY VG ARE IN TSUM.
C     SOURCE OF XT IS DETERMINED BY NX. NX=0 PREVIOUS VALUES
C                                       NX=1 FROM TRACE HEADERS
C                                       NX=2 FROM DATA CARDS
C                                       NX.GT.2 INTERNALLY GENERATED
C               USING NX AS FAR TRACE LOCATION, DECREMENTING BY DEL.
C     DEL IS TRACE SPACING. NOTE XT IS X DISTANCE FROM MIDPOINT,
C     AND ALWAYS REFERS TO A RECEIVER AT A POSITIVE-Y-COORDINATE.
C     NTYPE DETERMINES WHETHER TO COMPUTE SUMMATION (NTYPE=1)
C                               OR CORRELATION (NTYPE=2)
C     TWIN IS LENGTH OF CORRELATION WINDOW IN MILLISECONDS
C     TST IS START TIME OF DATA
C     TSP IS STOP TIME OF DATA
C     SAMR IS SAMPLE RATE IN SAMPLES/SECOND.
C****ALL PARAMETERS REVERT TO PREVIOUS VALUE IF NOT SPECIFIED*******
C     BLANK CARD STOPS PROGRAM
C
C*********************************************************************<
C
C     FOLLOWING ARE DEFAULT VALUES
      NX=1
      NFOLD=12
      NV=21
      NSKEW=11
      NTYPE=2
      TST=0.100
      TSP=2.0
      SAMR=250.
      DEL=440.
      DTXMX=.002
      VGO=7000.
      DVG=250.
      TWIN=40.
C     READ INPUT PARAMETERS
    1 READ 901,NREC,NXA,NVA,NSKEWA,NTYPEA,NFOLDA,TSTA,TSPA,
     1VGA,DVGA,DTXMXA,SAMRA,DELA,ADAA,TWINA
  901 FORMAT (6I5,2F5.0,F10.0,6F5.0)
      IF(NREC.EQ.0)GO TO 8
      IF(NXA.NE.0)NX=NXA
      IF(NVA.NE.0)NV=NVA
      IF(NSKEWA.NE.0)NSKEW=NSKEWA
      IF(NTYPEA.NE.0)NTYPE=NTYPEA
      IF(NFOLDA.NE.0)NFOLD=NFOLDA
      IF(TSTA.NE.0.0)TST=TSTA
      IF(TSPA.NE.0.0)TSP=TSPA
      IF(VGA.NE.0.0)VGO=VGA
      IF(DVGA.NE.0.0)DVG=DVGA
      IF(DTXMXA.NE.0.0)DTXMX=DTXMXA
      IF(SAMRA.NE.0.0)SAMR=SAMRA
      IF(DELA.NE.0.0)DEL=DELA
      IF(ADAA.NE.0.0)ADA=ADAA
      IF(TWINA.NE.0.0)TWIN=TWINA
      PRINT 903,NREC,TST,TSP,NFOLD,DEL,ADA,VGO,DVG,DTXMX
  903 FORMAT (1H1,15(2H3D),5H  REC,I4,2X,15(2H3D),//,13X,*SECONDS*,4X,4H
     1FOLD,2X,6HTR SPA,2X,6HOFFSET,2X,
     26HST VEL,2X,6HVELINC,2X,6HMXSKEW,/,8X,2F7.3,2X,I4,2X,F6.0,2X,F6.0,
     32X,F6.0,2X,F6.0,2X,F6.4,/)
      NFOLDA=NFOLD
      IF(NX.EQ.2)READ 902,(XT(I),I=1,NFOLD)
```

```
  902 FORMAT (8F10.0)
      IF(NX.EQ.1.OR.NX.EQ.2)GO TO 3
      X=NX
      DO 2 I=1,NFOLD
      XT(I)=X
    2 X=X-DEL
    3 NP=(TSP-TST)*SAMR+1.0001
C     NP IS NUMBER OF DATA POINTS PROCESSED IN EACH TRACE
C     NP*NFOLD CANNOT EXCEED DIMENSION OF T (NTXMX)
      NST=TST*SAMR+.001
C     NST IS THE FIRST DATA POINT TO BE USED
      NPMX=NTXMX/NFOLD
      IF(NP.LE.NPMX)GO TO 4
      NP=NPMX
      TSP=(NP-1)/SAMR+TST
      PRINT 904,TSP
  904 FORMAT (/,21(1H*),* UNABLE TO PROCESS FULL RECORD. WILL PROCESS TO
     1*,F7.3,* SEC*,21(1H*),/)
    4 NSKMX=NSMX/NP
      VMAX=VG0+(NV-1)*DVG
      IF(NSKEW.LE.NSKMX)GO TO 5
      NSKEW=NSKMX
      PRINT 905,NSKEW
  905 FORMAT (/,21(1H*),* UNABLE TO PROCESS FULL SKEW RANGE. WILL PROCESS
     1 *,I3,* SKEWS*,21(1H*))
C     THE INPUT TRACES,T,ARE FETCHED BY DATIN
    5 CALL DATIN(T,NP,NFOLD,NREC,ISCR,NX)
      PRINT 907,(I,XT(I),I=1,NFOLD)
  907 FORMAT (/,10X,*TRACE LOCATIONS*,//,(10X,6(I2,F6.0,2X)))
      XMX=0.0
      DO 6 J=1,NFOLD
    6 XMX=AMAX1(XMX,ABS(XT(J)))
C     VPSK CONTROLS THE VELOCITY AND SKEW SEARCH ROUTINES
    7 CALL VPSK(NP,NFOLD,T,TN,NSKEW,TVX,TSUM,TSKX)
      NFOLD=NFOLDA
      GO TO 1
    8 CONTINUE
      END
      SUBROUTINE VPSK(NP,NFOLD,T,TN,NSKEW,TVX,TSUM,TSKX)
      DIMENSION T(NP,NFOLD),TN(NP,NFOLD),TVX(NP,NSKEW),DSKEW(21),
     1NLABL(2),VGS(11),TSUM(NP,NSKEW),TSKX(1000)
      COMMON DVG,VG0,DTXMX,NV,NST,TST,NTYPE,XT(24),JA(3),ICON(48),DEL
     1,SAMR,TWIN,TS0(24),XMX,VMAX
      DATA NLABL/8HSUMATION,8HCORRELAT /
      LWIN=TWIN*SAMR/1000.+1.00001
      RANGE=1.0E-99
      VG=VG0
      DO 109 IV=1,NV
      DO 101 J=1,NFOLD
C     NMO T TRACES TO TN TRACES LOCATED AT XT WITH VELOCITY VG
C     TEST FOR END TRACE TRUNCATION IN DATA WINDOW
      NPM=NP
      TSP=TST+(NP-1)/SAMR
      DWIN=TSP-TST
      TST2=TST**2
      XVMX=(2.0*XT(J)/VMAX)**2
      TMX=TST2+XVMX+DWIN**2+2.*DWIN*SQRT(TST2+XVMX)-(2.*XT(J)/VG )**2
      IF(TMX.GE.(TSP-0.5/SAMR)**2) GO TO 101
      IF(TMX.GE.0.0)TMX=SQRT(TMX)-0.5/SAMR
      PRINT 906,TMX,VG,J
  906 FORMAT (/,20(1H*),* VELOCITY RANGE CAUSES FAR TRACE TRUNCATION BE
     1GINNING AT T=*,F6.3,*. VELOCITY=*, F6.0,*. TRACE *,I2,20(1H*))
      IF(TMX.LT.0.0) NPM=0
      NPM=TMX*SAMR-NST-.99999
      NPM1=NPM+1
C     ZERO TRACE VALUES THAT CANNOT BE COMPUTED IN NMO
      DO 100 K=NPM1,NP
  100 TN(K)=0.0
C     CORRECT FOR NMO
  101 CALL NMO(VG,XT(J),T(1,J),TN(1,J),NPM,J)
C     ZERO THE TSUM ARRAY
      LSUM=NSKEW*NP
      DO 102 L=1,LSUM
  102 TSUM(L)=0.0
      IF(NSKEW.NE.1)DELTX=2.*DTXMX/(NSKEW-1)
      DTX=-DTXMX
C     DELTX IS THE SKEW INCREMENT
      DO 103 IS=1,NSKEW
      DSKEW(IS)=DTX
      CALL SKEWSUM(TN,DTX,NFOLD,TSUM(1,IS),NP)
C     THIS IS THE STACKED TRACES FOR VELOCITY VG FOR EACH SKEW
  103 DTX=DTX+DELTX
C     SUMMATION IS FINISHED. NEXT COMPUTE CROSS CORRELATION IF NEEDED.
      IF(NTYPE.EQ.1)GO TO 106
C     SQUARE SUMMED TRACES
      CALL ARAYSQ(TSUM,NP,NSKEW)
C     SQUARE TRACES
      CALL ARAYSQ(TN,NP,NFOLD)
C     COMPUTE SUM OF SQUARES AND SUBTRACT FROM SQUARED SUMS
C     AT EACH SKEW
      DO 104 IS=1,NSKEW
  104 CALL SKEWSUM(TN,DSKEW(IS),NFOLD,TSUM(1,IS),NP)
      DO 105 IS=1,NSKEW
C     APPLY BRICKWALL TIME WINDOW TO CROSSCORRELATION
  105 CALL WINSUM(TSUM(1,IS),LWIN,NFOLD,NP)
C     SAVE MAX VALUE FOR EACH SKEW IN TVX
  106 CONTINUE
      DO 107 IS=1,NSKEW
```

```
      107 CALL TSTMAX(IV,TSUM(1,IS),TVX(1,IS),NP,RANGE)
C         SAVE MAX VALUE FOR THIS VELOCITY IN TSKX
          DO 108 IS=2,NSKEW
      108 CALL TSTMAX(IS,TSUM(1,IS),TSKX,NP,RANGE)
C         PUT TSKX ON DISC FOR LATER USE
          WRITE(2)IV,NP,VG,(TSKX(ISS),ISS=1,NP)
      109 VG=VG+DVG
          REWIND 2
          IF(LWIN.EQ.0) LWIN=1
          IF(NTYPE.EQ.1) LWIN =1
C         SUMMATION IS REVERSE POLARITY. REVERSE POLARITY PLOT OBTAINED WITH NEG LP
          LP =(NP-LWIN+1)*(-1)**NTYPE
          PRINT 1001,NLABL(NTYPE),DTXMX
     1001 FORMAT(   *1MAX*,A8,* AS F(SKEW).SKEW RANGE-+*,F6.4)
          CALL PRNPLHC(NP,NSKEW,TVX,-RANGE,DSKEW,LP)
          LINES=11
          IVEL=NV
          IRED=NV
      110 IF(IRED.GT.LINES)IRED=LINES
C         PLOT AS F(V)FOR LINES VALUES AT A TIME
          IVEL=IVEL-LINES+1
          DO 111 JN=1,IRED
      111 READ(2)IV,MP,VGS(JN),(TVX(IN,JN),IN=1,NP)
          BACKSPACE 2
          PRINT 1002,NLABL(NTYPE),RANGE
     1002 FORMAT(    * MAX *,A8,* AS F(VELOCITY), MAX VALUE =*,E10.3,/)
          CALL PRNPLHC(NP,IRED,TVX,-RANGE,VGS,LP)
          IRED=IVEL
          IF(IVEL.GT.1)GO TO 110
          REWIND 2
          VG=VGO
          RETURN
          END
          SUBROUTINE NMO(V,X,T,TN,NP,NTR)
          DIMENSION T(1),TN(1)
          COMMON DVG,VGO,DTXMX,NV,NST,TST,NTYPE,XT(24),JA(3),ICON(48),DEL
         1,SAMR,TWIN,TSO(24),XMX,VMAX
C         COMPUTE NORMAL MOVEOUT AT VELOCITY VG, LOCATION X
C         W.R.T. CSP, ORIGINAL TRACE T, NMOED TRACE TN
C         COMPUTE NORMAL MOVEOUT USING WANG METHOD
          II=1
          XV2S=(2.*X*SAMR/V)**2
          TMS=TST*SAMR
          TSP=TST+(NP-1)/SAMR
          KST=(TSO(NTR)-TST)*SAMR+1.0E-6
C         KMIN=MINIMUM SHIFT, KMAX=MAXIMUM SHIFT
       11 KMIN=SQRT((TSP*SAMR)**2+XV2S)-TSP*SAMR+0.5
          KMAX=SQRT(TMS*TMS+XV2S)-TMS+0.5
          IF(KMAX.EQ.0)GO TO 5
          IF(KMIN.GT.KST)KMIN=KST
          NO=NP+KMIN
          B=1.75-TMS+KMIN/2.
          C=XV2S/2
          DO 2 K=KMIN,KMAX
C         NS=LOWER LIMIT FOR SHIFT K, NO=UPPER LIMIT FOR SHIFT K
          NS=B+C/(K+.5)
          DO 1 J=NS,NO
        1 TN(J-K)=T(J-KST)
          B=B+0.5
        2 NO=NS
          RETURN
        5 CONTINUE
          DO 6 I=1,NP
        6 TN(I) = T(I)
          RETURN
          END
          SUBROUTINE SKEWSUM(T,DTX,NFOLD,TSUM,NP)
          DIMENSION T(NP,NFOLD),TSUM(1)
          COMMON DVG,VGO,DTXMX,NV,NST,TST,NTYPE,XT(24),JA(3),ICON(48),DEL
         1,SAMR,TWIN,TSO(24),XMX,VMAX
C         SUMS TRACES ALONG SKEWED STRAIGHT LINE
C         LINEARLY INTERPOLATES BETWEEN DATA POINTS
C         SUBTRACTS RESULT FROM PREVIOUSLY SUMMED VALUE. THIS MINIMIZES STORAGE
          DTXSR=DTX*SAMR/DEL
          DO 2 J=1,NP
          SUM=0.0
          DO 1 I=1,NFOLD
          SKEW=XT(I)*DTXSR
C         ERR=FRACTION OF SAMPLE INCREMENT
          ERR=SKEW-IFIX(SKEW)
          NS=J+SKEW
          IF(ERR.LT.0.) ERR=ERR+1.0
          IF(NS.LE.0.OR.NS.GE.NP)GO TO 1
          SUM=SUM+T(NS,I)*(1.0-ERR)+T(NS+1,I)*ERR
        1 CONTINUE
        2 TSUM(J)= TSUM(J)-SUM
          RETURN
          END
          SUBROUTINE ARAYSQ(F,IL,JL)
          DIMENSION F(1)
          LEN=IL*JL
          DO 1 L=1,LEN
        1 F(L)=F(L)**2
          RETURN
          END
          SUBROUTINE WINSUM(F,LW,NFOLD,NP)
          DIMENSION F(1)
          COMMON DVG,VGO,DTXMX,NV,NST,TST,NTYPE,XT(24),JA(3),ICON(48),DEL
```

```
      1,SAMR,TWIN,TSO(24),XMX,VMAX
C     COMPUTE SINGLE TRACE SUMMATION OVER BRICKWALL TIME WINDOW
C     OF LENGTH LW. NORMALIZE SUM FOR CROSSCORRELATION OF NFOLD TRACES
      FAC = LW*NFOLD**2
      NPQ=NP-LWIN+1
      SUM=0.0
      DO 1 IW=1,LW
    1 SUM=F(IW)+SUM
      FF=F(1)
      F(1)=SUM/FAC
      LW1=LW-1
      DO 2 I=2,NPQ
      SUM=SUM-FF+F(I+LW1)
      FF=F(I)
    2 F(I) = SUM/FAC
      RETURN
      END
      SUBROUTINE TSTMAX(M,T,TMAX,NP,RANGE)
      DIMENSION T(1),TMAX(1)
      IF(M.GT.1)GO TO 2
      DO 1 I=1,NP
    1 TMAX(I)=T(I)
      RETURN
    2 CONTINUE
      DO 3 I=1,NP
      IF(ABS(T(I)).GT.ABS(TMAX(I)))TMAX(I)=T(I)
      IF(ABS(TMAX(I)).GT.RANGE)RANGE=ABS(TMAX(I))
    3 CONTINUE
      RETURN
      END
      SUBROUTINE PRNPLHC(NP,NW,X,XMX,PAR,IP)
      DIMENSION X(NP,NW),SYM(21),SX(101),PAR(1)
      COMMON DVG,VGO,DTXMX,NV,NST,TST,NTYPE,XT(24),JA(3),ICON(48),DEL
     1,SAMR,TWIN,TSO(24),XMA,VMAX
      DATA SYM/1HJ,1HI,1HH,1HG,1HF,1HE,1HD,1HC,1HB,1HA,1H ,1H1,1H2,1H3,1
     1H4,1H5,1H6,1H7,1H8,1H9,1H+/,NLINE/3/
C     HORIZONTAL CONTOUR PRINT PLOT. NP POINTS, 101 AT A TIME,
C     NWIDE, 0 TO X MAX FOR XMAX.GT.0,
C     -XMAX TO + XMAX FOR XMAX.LT.0.
      XMAX = XMX
      NPT=101
      TW=(NPT-1)/SAMR
      TO=TST+(TWIN/2000.)*(NTYPE-1)
      TU=TO+TW
      BIAS=1.5
      IF(XMAX.GT.0.0)GO TO 1
      BIAS = 11.5
      XMAX=-2.*XMAX
    1 SF=20./XMAX
C     IF IP IS NEGATIVE, REVERSE THE POLARITY
      IF(IP.LT.0) SF=-SF
      LP=IABS(IP)
      NPL=LP
   10 IF(NPL.LE.NPT)NPT=NPL
      NLINE = NLINE+NW+2
      IF(NLINE.LT.60) GO TO 11
      NLINE=3
      PRINT 2002
 2002 FORMAT(1H1,////)
   11 KM=LP-NPL
      NPL=NPL-100
      PRINT 1000,TO,TU
 1000 FORMAT(18X,F6.3,21X,1H*,24X,1H*,24X,1H*,22X,F6.3)
      DO 3 K=1,NW
      DO 2 J=1,NPT
      JP=J+KM
      NX=X(JP,K)*SF+BIAS
      IF(NX.LT.1) NX = 1
      IF(NX.GT.21) NX=21
    2 SX(J)=SYM(NX)
      PRINT 1001,PAR(K),(SX(J),J=1,NPT)
 1001 FORMAT (5X,G12.5,3X,101A1)
    3 CONTINUE
      PRINT 1000,TO,TU
      TO=TU
      TU=TU+TW
      PRINT 1002
 1002 FORMAT(////)
      NLINE=NLINE+3
    4 IF(NPL.GT.1) GO TO 10
      PRINT 2002
      NLINE=3
      RETURN
      END
      SUBROUTINE DATIN(T,NP,NFOLD,IRECN,ISCR,NX)
      DIMENSION T(NP,NFOLD),ISCR(1)
      COMMON DVG,VGO,DTXMX,NV,NST,TST,NTYPE,XT(24),JA(3),ICON(48),DEL
     1,SAMR,TWIN,TSO(24),XMX,VMAX
      NTOT=NST+NP-1
      INT=1
    7 CALL SISIN(IRECN,INT,ICON,T(1,INT),NTOT,3H32F,1,ISCR,JA)
C     TEST FOR DEAD TRACE
      IF(ICON(10).NE.1) GO TO 8
      INT=INT-1
      NFOLD=NFOLD-1
      GO TO 11
    8 IF(NX.NE.1) GO TO 9
C     READ TRACE POSITIONS FROM HEADER IF NX=1
```

```
      ADA=IABS(ICON(22))
C     SIGN OF TRACE X DISTANCE IS DEPENDANT ON SIGN OF Y (ADA)
      XT(INT)=ICON(40)*ICON(22)*0.5/ADA
C     COMPUTE FIRST DATA POINT TO READ IF VELOCITY VMAX
    9 L=SQRT(TST**2+(XT(INT)**2./VMAX)**2)*SAMR+0.5
      TSO(INT)=L/SAMR+1.0E-08
      L=L+1
      IF(L.EQ.1)GO TO 11
C     DISCARD FIRST L POINTS
      DO 10 NLOP=1,NP
      T(NLOP,INT)=T(L,INT)
   10 L=L+1
   11 INT=INT+1
      IF(INT.LE.NFOLD) GO TO 7
      RETURN
      END
      SUBROUTINE SISIN(IRECN,ITRN,ICON,ISAMP,NSAMP,IKEY,IU,ISCR,JA)
C     3/8/74 MODIFIED TO ACCEPT EXTENDED SISMO PACKED 32-BIT
C            TRUNCATED FLT PT DATA LABELED REFLECT IN HEADER WD 2
C     INPUT SISMO TRACE ITRN FROM RECORD IRECN
C        KEEPING NSAMP SAMPLES.  TRACE CONSTANTS WILL BE
C        STORED IN ICON AND SAMPLES IN ISAMP.  THE PACKED
C        TRACE IS READ FROM UNIT IU INTO SCRATCH ARRAY
C        ISCR. PROGRAM WILL REWIND UNIT ONCE TO LOOK
C        FOR CORRECT ENTITY-ASSUMMING RECORD AND
C        TRACE NOS. ARE ALWAYS INCREASING
C     IKEY=3HINT MEANS UNPACK INTEGER SAMPLES INTO ISAMP
C     IKEY=3HFLT MEANS PUT REAL VALUES INTO ISAMP
C     IKEY=3HPCK MEANS READ INTO ISCR AND EXIT
C     IKEY=3H2FP MEANS DATA WAS PACKED WITH TWO TRUNCATED 30-BIT
C        FLT PT SAMPLES PER 60-BIT WORD.  UNPACK INTO ARRAY AS
C        FLT POINT VALUES.
C     IKEY=3H32F MEANS DATA IS PACKED AS 32-BIT FLT PT SAMPLES
C        AND WILL BE UNPACKED INTO ARRAY AS FLT PT VALUES
C     IF NO DATA INPUT ALL JA CELLS SET TO NEGATIVE
      DIMENSION ICON(1),ISAMP(1),ISCR(1),JA(3)
      IRWND=0
      IDCK=8LREFLECT
      JA(1)=JA(2)=JA(3)=-77B
      IF(NSAMP.LE.0)GO TO 1000
      IF(IKEY.EQ.3HINT)GO TO 50
      IF(IKEY.EQ.3HFLT)GO TO 50
      IF(IKEY.EQ.3HPCK)GO TO 50
      IF(IKEY.EQ.3H2FP)GO TO 50
      JWDS=50+(NSAMP*32)/60
      IF(MOD(NSAMP,15).NE.0)JWDS=JWDS+1
      IF(IKEY.EQ.3H32F)GO TO 50
      GO TO 1000
   50 CONTINUE
      CALL STRIN(IU,ISCR,JWDS,JA)
      JA(3)=JWDS
      IF(JA(2).EQ.0)GO TO 1000
      N1=10  $  N2=11
      IF(ISCR(2).EQ.0)GO TO 52
      IDC=ISCR(2).AND..NOT.7777B
      IF(IDC.NE.IDCK)GO TO 50
      N1=48  $  N2=49
   52 ICK=IRECN-ISCR(1)
      IF(ICK)55,60,50
   55 IF(IRWND.NE.0)GO TO 56
      REWIND IU
      IRWND=77B
      GO TO 50
   56 JA(1)=JA(2)=JA(3)=-77B
      GO TO 1000
   60 ICK=ITRN-ISCR(6)
      IF(ICK)65,100,50
   65 IF(IRWND.NE.0)GO TO 56
      IRWND=77B
      NBCK=1-ICK
      DO 70 I=1,NBCK
      BACKSPACE IU
   70 CONTINUE
      GO TO 50
  100 CONTINUE
      IF(IKEY.EQ.3HPCK)GO TO 1000
      CALL AMOVE(ISCR,ICON,N1)
      IF(IKEY.EQ.3H2FP)GO TO 110
      IF(IKEY.EQ.3H32F)GO TO 200
      CALL UNPK24(ISAMP,ISCR(N2),NSAMP)
      IF(IKEY.EQ.3HINT)GO TO 1000
      CALL FLTALL (ISAMP,ISAMP,NSAMP)
      GO TO 1000
  110 CALL F30IN(ISAMP,ISCR(N2),NSAMP)
      GO TO 1000
  200 CALL UNPK32(ISAMP,ISCR(N2),NSAMP)
 1000 CONTINUE
      RETURN
      END
      IDENT     UNPK32
      ENTRY     UNPK32
      VFD       42/6LUNPK32,18/3
*     CALL UNPK32(ARRAY,BUFF,NS)
*          UNPACK 32-BIT FLT PT NUMBERS PACKED HEAD-TO-TAIL IN 60-BIT
*             WORDS.  UNPACK NS FLT PT VALUES FROM THE PACKED BUFF
*             AND STORE AS 60-BIT FLT PT VALUES IN ARRAY
UNPK32 DATA       0
       SB7       1            INITIAL
```

```
        SB1     X1
        SA1     A1+B7       SET PARAM 2
        SB2     X1
        SA1     A1+B7       SET PARAM 3
        SB3     X1
        SA2     B3          NO. SAMPLES IN X2
        ZR      X2,UNPK32
        NG      X2,UNPK32
        SB3     X2+B1       LWA+1 INTO B3 FOR CHECKING
CYCLE   MX0     4
        MX1     32
        MX2     28
        LX2     28
ONE     SA3     B2          PACKED WORD IN X3
        BX6     X3*X1       GET COMPLETE SAMPLE
        RJ      STORE
        BX5     X3*X2       SAVE PART WORD
        SB2     B2+1        INC. PICKUP ADDRESS
TWO     SA3     B2          PACKED WORD INTO X2
        LX1     56          RT SHIFT 4 W/O SIGN EXTENSION
        AX2     4           RT SHIFT 4
        BX4     X3*X0       GET REMAINDER OF SAMPLE
        BX6     X4+X5       SPLICE 28 AND 4 BITS
        LX6     32          SHIFT SAMPLE TO BIT 60
        RJ      STORE
        BX6     X3*X1       GET COMPLETE SAMPLE
        LX6     4           SHIFT SAMPLE TO BIT 60
        RJ      STORE
        BX5     X3*X2       SAVE PART WORD
        SB2     B2+1        INC. PICKUP ADDRESS
        SB4     B0-6        SET NEG LOOP COUNT
        SB5     36          SET UP SHIFT VALUE
THREE   SA3     B2
        AX1     4
        AX2     4           RT SHIFT ALL 3 MASKS BY 4
        AX0     4
        BX4     X3*X0       PICK UP PARTIAL
        BX6     X4+X5       SPLICE PARTIALS TOGETHER
        LX6     X6,B5       MOVE 32-BIT SAMPLE TO LEFT END
        RJ      STORE
        BX6     X3*X1       GET COMPLETE SAMPLE
        SB5     B5-28
        LX6     X6,B5       SHIFT SAMPLE TO BIT 60
        RJ      STORE
        BX5     X3*X2       SAVE PART WORD
        SB2     B2+1        INC. PICKUP ADDRESS
        SB5     B5+32       INC. LEFT SHIFT COUNT BY 4
        SB4     B4+1        INC. LOOP COUNT
        EQ      B4,B0,CYCLE
        EQ      THREE
STORE   DATA    0
        AX6     28          RT SHIFT
        LX6     28          LEFT SHIFT
        SA6     B1          STORE SIGN EXTENDED VALUE
        SB1     B1+1
        EQ      B1,B3,UNPK32
        EQ      STORE
        END
        SUBROUTINE STRIN(IU,ISCR,JWDS,JA)
C       BUFFER IN NEXT RECORD FROM UNIT IU
C       (READ PACKED SISMO TRACE INTO ISCR ARRAY)
C       RETURN JWDS=NO. WORDS READ
C       JA(1),JA(2),JA(3)ARE SADS-LIKE FLAGS
        DIMENSION ISCR(1),JA(3)
        MX=JWDS
        JA(1)=JA(2)=JA(3)=77B
        BUFFER IN(IU,1)(ISCR(1),ISCR(MX))
        IF(UNIT(IU)) 150,120,130
C       ENCOUNTERED A FILE MARK
120     JA(2)=JWDS=0
        BACKSPACE IU
        GO TO 200
C       ENCOUNTERED UNRECOVERABLE PARITY ERROR
130     JA(1)=0
150     JWDS=LENGTH(IU)
200     CONTINUE
        RETURN
        END
        IDENT   AMOVE
*
*       SAMPLE CALL
*       CALL AMOVE(ARRAY1,ARRAY2,NS)
*       MOVE NS CELLS FROM ARRAY1 TO ARRAY2
*       DOES NOT CHECK FOR OVERLAP
*       WRITTEN BY J. HODGE
*
        ENTRY   AMOVE
        VFD     42/5LAMOVE,18/3
AMOVE   DATA    0
        SB7     1           INITIAL
        SB1     X1
        SA1     A1+B7       SET PARAM 2
        SB2     X1
        SA1     A1+B7       SET PARAM 3
        SB3     X1
        SA3     B3          GET COUNT
        ZR      X3,AMOVE    EXIT ON ZERO COUNT
        NG      X3,AMOVE    EXIT ON NEG COUNT
```

```
            SB6    X3           SET B6 TO COUNT
            SB1    B1+B6        B1=PICKUP ADDRESS+COUNT
            SB7    B2+B6        B7=STORE ADDRESS+COUNT
            SB6    -B6          PUT NEGATIVE COUNT IN B6
    GO      SA1    B1+B6        PICK UP WORD TO MOVE
            BX7    X1           MOVE WORD TO X7 TO STORE
            SA7    B7+B6        STORE WORD IN SECOND ARRAY
            SB6    B6+1         INCREMENT NEGATIVE COUNT
            NZ     B6,GO        DO ANOTHER IF B6 NON-ZERO
            EQ     B0,AMOVE     EXIT WHEN COUNT EQ ZERO
            END
```

```
   23      1    21    11    2    24 0.80 1.60        10000  250. .0080  250.  440.  7040  40.
      5 5280    11    11    2    24 0.80 1.60         9000. 250. .0020  250.  440.  6600  40.
MODEL 1.25              0.       45.      5000.       9999.
      5 5280    11    11    2    24 1.20 2.00         9000. 250. .0020  250.  440.  6600  40.
MODEL 1.25              0.       45.      5000.       9999.
```

```
         MFA    NOS/BE 1.1 MRDC-FRLRELEASE430 10/23/76
16.24.26.LIST28Y  FROM
16.24.26.IP    00002560 WORDS  -  FILE INPUT   , DC 00
16.24.26.LIST29.    LIST 29 DECK
16.24.31.ACCOUNT(50100627000,MGBLOOMQUIST    )
16.24.31.COPYBF,INPUT,DUMMY.
16.24.32.REWIND DUMMY.
16.24.32.COPYSBF,DUMMY,OUTPUT.
16.24.32.OP    00002624 WORDS  -  FILE OUTPUT  , DC 40
16.24.32.MS        3584 WORDS  (    10752 MAX USED)
16.24.32.CPA        .185 SEC.             .029 ADJ.
16.24.32.IO         .453 SEC.             .784 ADJ.
16.24.32.CM        4.263 KWS.             .011 ADJ.
16.24.32.SS                               .825
16.24.32.PP        3.938 SEC.       DATE 09/19/77
16.24.32.EJ    END OF JOB, **

**********       LIST28Y  ////  END OF LIST  ////
**********
```

What is claimed is:

1. The method of producing a stacked seismic section in seismic exploration comprising:
   generating linear, multiple fold, common depth point sets of seismograms with three dimensional reflection geometry, the reflections of seismic energy appearing across each set with time differences which are substantially on a hyperbola,
   normal move-out correcting said sets with trace spacings determined by the source receiver-coordinate distance along the lines of exploration and with given values of searching velocity and travel time,
   detecting the power of the seismic signal in the normal move-out corrected sets,
   determining from the maximum detected signal the hyperbola velocity and the offset of the apex of said hyperbola from the point of minimum source-receiver separation,
   from said hyperbola velocity and apex offset, determining the dip and strike of the subsurface interface producing reflections in said seismograms and the average velocity of the path of said seismic energy to said subsurface interface, and
   correcting said seismograms to zero source receiver time with time corrections determined from said average velocity, dip and strike, and
   stacking the corrected seismograms to produce a three-dimensional common depth point stacked seismic section.

2. The method recited in claim 1 further comprising:
   from said average velocity, dip and strike, determining the time correction for correcting each trace of a set to zero source-receiver time, and
   correcting said seismograms to zero source-receiver time.

3. The method recited in claim 2 further comprising:
   stacking the corrected seismograms to produce a three dimensional common depth point stacked seismic section.

4. The method recited in claim 1 wherein hyperbola velocity $V_a$ and hyperbola offset h are determined from stacking velocity $V_s$ and slope $\Delta t$ by the following:

$$V_a = V_s / \sqrt{1 + (V_s \Delta t)^2} \quad h = -T_0 V_a^2 \Delta t$$

5. The method recited in claim 1 wherein the step of normal move-out correcting includes time shifting each trace in a set by an amount:

$$\delta T = T_x - \sqrt{T_x^2 - X^2/X_{nmo}^2}$$

where $T_x$ is the travel time on each trace in a set, X is the source receiver coordinate distance along said lines of exploration, and $V_{nmo}$ is the searching velocity.

6. The method recited in claim 1 wherein the step of generating sets of seismograms includes:
   generating pulses of seismic energy at spaced points along at least one line of exploration;
   detecting seismograms representing the reflection of seismic energy at spaced points along at least one other parallel line of exploration, and
   gathering detected seismograms into sets representing reflections from common depth points.

7. In seismic exploration wherein seismograms are obtained from three dimensional reflection geometry, the method of correcting said seismograms to zero source-receiver times and producing a stacked seismic section comprising:
   generating pulses of seismic energy at spaced points along at least one line of exploration;
   detecting seismograms representing the reflection of seismic energy at spaced points along at least one other parallel line of exploration;
   gathering detected seismograms into sets representing reflections from common depth points;
   normal move-out correcting said sets for given values of searching velocity V and travel time $T_O$, detecting the power of the seismic signal in the normal move-out corrected sets, determining the stacking velocity associated with the maximum detected signal and the slope of the straight line through common reflections on each normal move-out corrected set which produced said maximum detected signal;

from said stacking velocity and slope, determining the dip and strike of the subsurface interface producing reflections in said seismograms and the average velocity of the path of said seismic energy to said subsurface interface;

from said average velocity, dip and strike, determining the time correction for correcting each trace to zero source-receiver time; and stacking the corrected seismograms to produce a three dimensional common depth point stacked seismic section.

8. The method recited in claim 7 wherein the step of determining dip, strike and average velocity is carried out using two adjacent CDP sets and wherein the step of determining the dip $\theta$, strike $\phi$, and average velocity V is performed in accordance with $$V = V_a \sqrt{w/(1 + w)}$$

$$\phi = \tan^{-1}\left(\frac{-V_a^2 \Delta t_1 T_{01}}{\eta} w\right)$$

$$\theta = \sin^{-1}\left\{ \sqrt{1 - (V/V_a)^2} \ / \cos \phi \right\}$$

where $$w = \frac{-\psi_2 \pm \sqrt{\psi_2^2 - 4\psi_1\psi_3}}{2\psi_1}$$

$$\psi_1 = \left(\frac{V_a}{2}\right)^2 \left[ \left(\frac{T_{01}^2 - T_{02}^2}{2\delta x}\right)^2 - T_{01}^2 \Delta t_1^2 \right]$$

$$\psi_2 = \left(\frac{\eta}{V_a}\right)^2 + \frac{T_{01}^2 V_a^2 \Delta t_1^2}{2} - \left(\frac{T_{01}^2 + T_{02}^2}{2}\right)$$

$$\psi_3 = \frac{\delta x^2 + \eta^2}{V_a^2}$$

$\delta x$ = distance between CDP points, $V_a$ is hyperbola velocity, $\Delta t$ is the slope of the straight line for a CDP set, $T_O$ is travel time for trace at x=0, $\eta$ is the distance between the line of exploration on which pulses of seismic energy is generated and the line of exploration on which seismic energy is detected and, subscripts 1 and 2 denote the two adjacent CDP sets along the line of exploration.

* * * * *